July 5, 1955     D. E. COPPLE     2,712,238
PRECISION BAROGRAPH
Filed April 26, 1952     3 Sheets-Sheet 1

INVENTOR.
DAVID E. COPPLE,
BY
ATTORNEY.

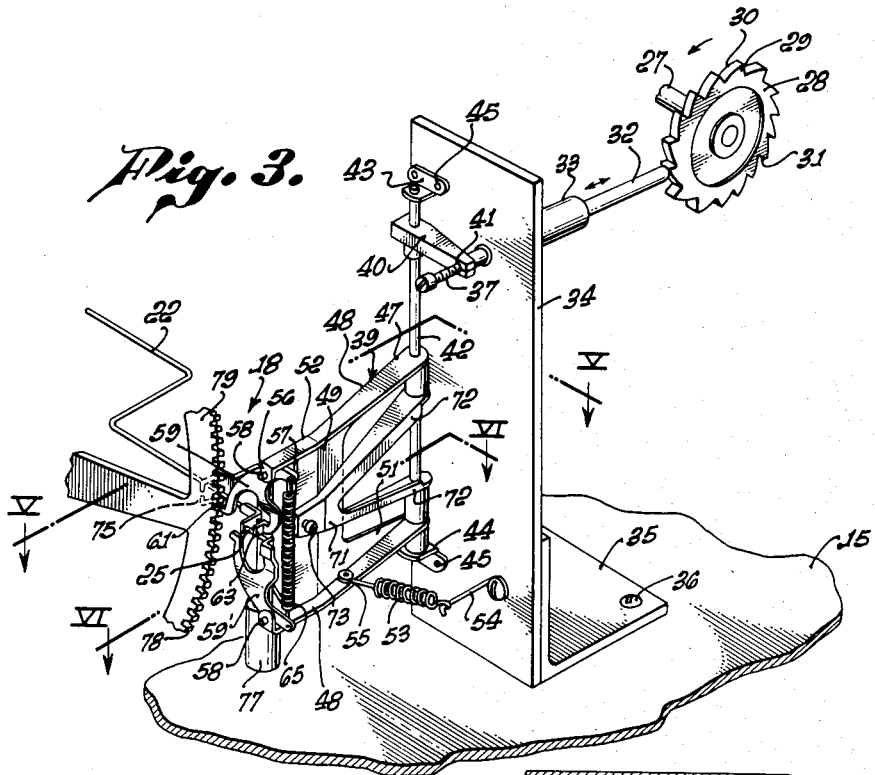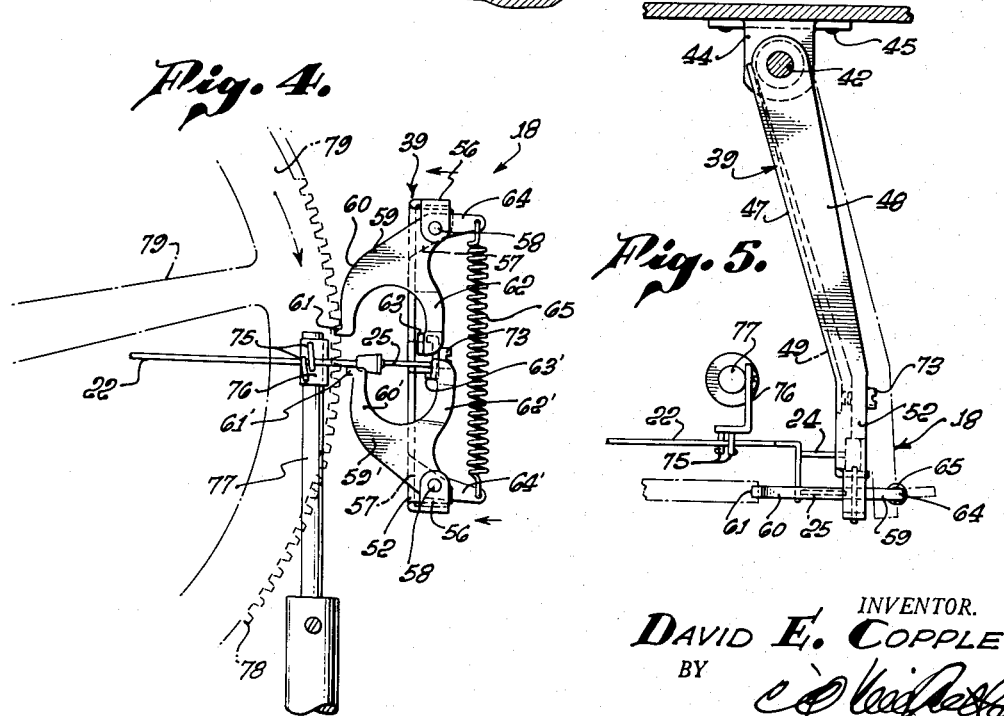

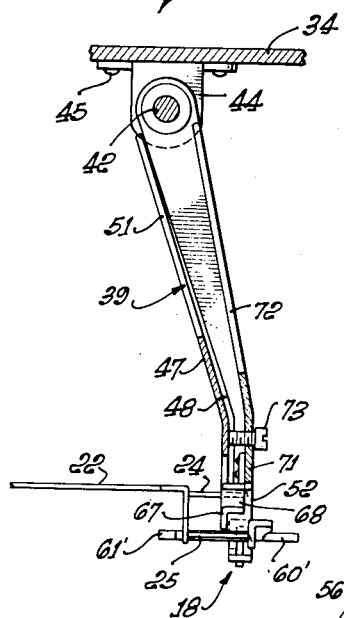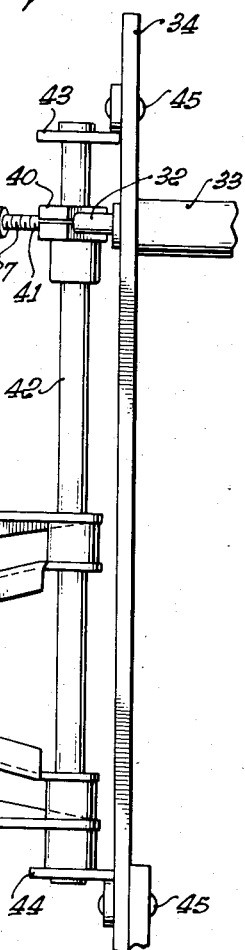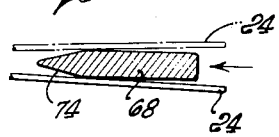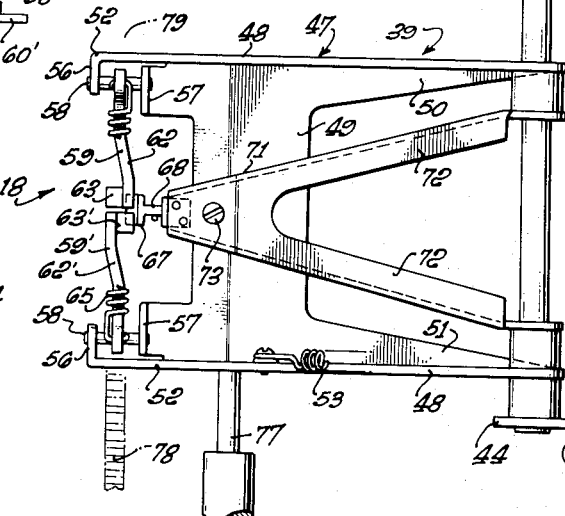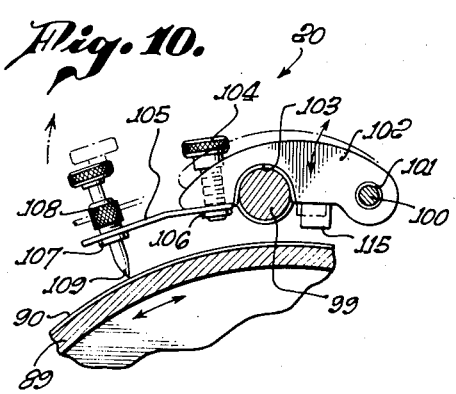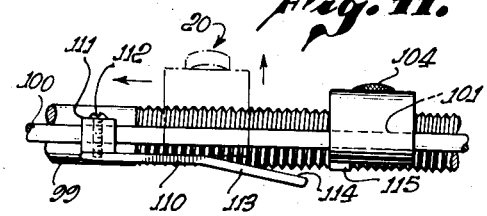

United States Patent Office 2,712,238
Patented July 5, 1955

2,712,238

PRECISION BAROGRAPH

David E. Copple, Los Angeles, Calif., assignor to Arch F. Munter, doing business under the name and style of the American Paulin System, Los Angeles, Calif.

Application April 26, 1952, Serial No. 284,594

2 Claims. (Cl. 73—386)

This invention relates to a precision instrument for recording minute changes of atmospheric pressure and more particularly to a portable, mechanically-driven instrument capable of responding to and recording minute changes of atmospheric pressure accurately, as for example, to .001 of an inch of mercury, or the approximate equivalent of a change in atmospheric pressure equal to one foot of elevation.

The invention is directed to a precision field-type barometer which may be employed in field surveying together with a surveying altimeter. In field surveying with surveying altimeters, normally two such altimeters are employed. One altimeter is used at a base point to record periodically atmospheric pressure changes at the base point. The other altimeter is carried over the terrain being surveyed to record at selected time intervals atmospheric pressure along the route taken. When the roving field man returns to the base point, the recorded readings which he has made are corrected by comparing them with the records of the surveying altimeter maintained at the base point.

In such an arrangement, one individual is stationed at the base point to record atmospheric pressure changes as indicated by the altimeter at the base point at prearranged spaced time intervals. Such a task is exceedingly tiresome and boresome for an individual at the base point. Often, the record is not made at the preselected time interval, thus introducing a possible source of error in final calculations when the pressures recorded along the surveying route are corrected.

It is the primary object of this invention to design and provide a precision barograph which may be utilized to take the place of a surveying altimeter and an individual at a base point as described above.

An object of the invention is to design and provide a precision barograph, wherein a continuous, accurate, reliable recording of atmospheric pressure changes may be made and wherein said record may be read to an accuracy of .001 of an inch of mercury.

A further object of this invention is to design and provide an improved barograph utilizing novel means for transferring the response of a pressure responsive device to a recording chart.

Still another object of this invention is to design and provide an improved precision field barograph, wherein the record chart and recording means are arranged in a novel manner.

Generally speaking, this invention comprises a light-weight, portable precision recording field barograph which is sensitive to minute changes of pressure while being rugged and strongly constructed so as to withstand jolting and shaking when carried cross country to a base point during a survey. The field barograph of this invention may be mounted in a suitable carrying case and comprises a suitable pressure responsive device modified to cooperate with means sensitive to the pressure response of said device at selected time intervals, and means for transferring the pressure response from the sensitive means to a recording means. The recording means is arranged for novel cooperation with a recording pen so that pressure differentials are indicated in the range of .001 of an inch of mercury.

Other objects and advantages of this invention will be readily apparent from the following description of the drawings.

In the drawings:

Fig. 3 is a fragmentary enlarged perspective partial view of means for transferring the pressure response of a pressure responsive device to a recording means;

Fig. 4 is a fragmentary enlarged view taken from the left of Fig. 3;

Fig. 5 is a fragmentary enlarged view taken in a horizontal plane indicated by lines V—V;

Fig. 6 is a fragmentary sectional view taken in a horizontal plane indicated by line VI—VI of Fig. 3;

Fig. 7 is a fragmentary enlarged end view of a portion of the device shown in Fig. 3;

Fig. 8 is a fragmentary enlarged perspective view of the pointer on the pressure responsive device in cooperative relation with the means for transferring the pressure response;

Fig. 9 is a fragmentary enlarged sectional view taken in the plane indicated by line IX—IX of Fig. 8;

Fig. 10 is a fragmentary sectional view showing a recording pen carrying means employed with the device shown in Fig. 1;

Fig. 11 is a fragmentary side view of one end of the time screw shown in Fig. 1;

Figures 1, 2:
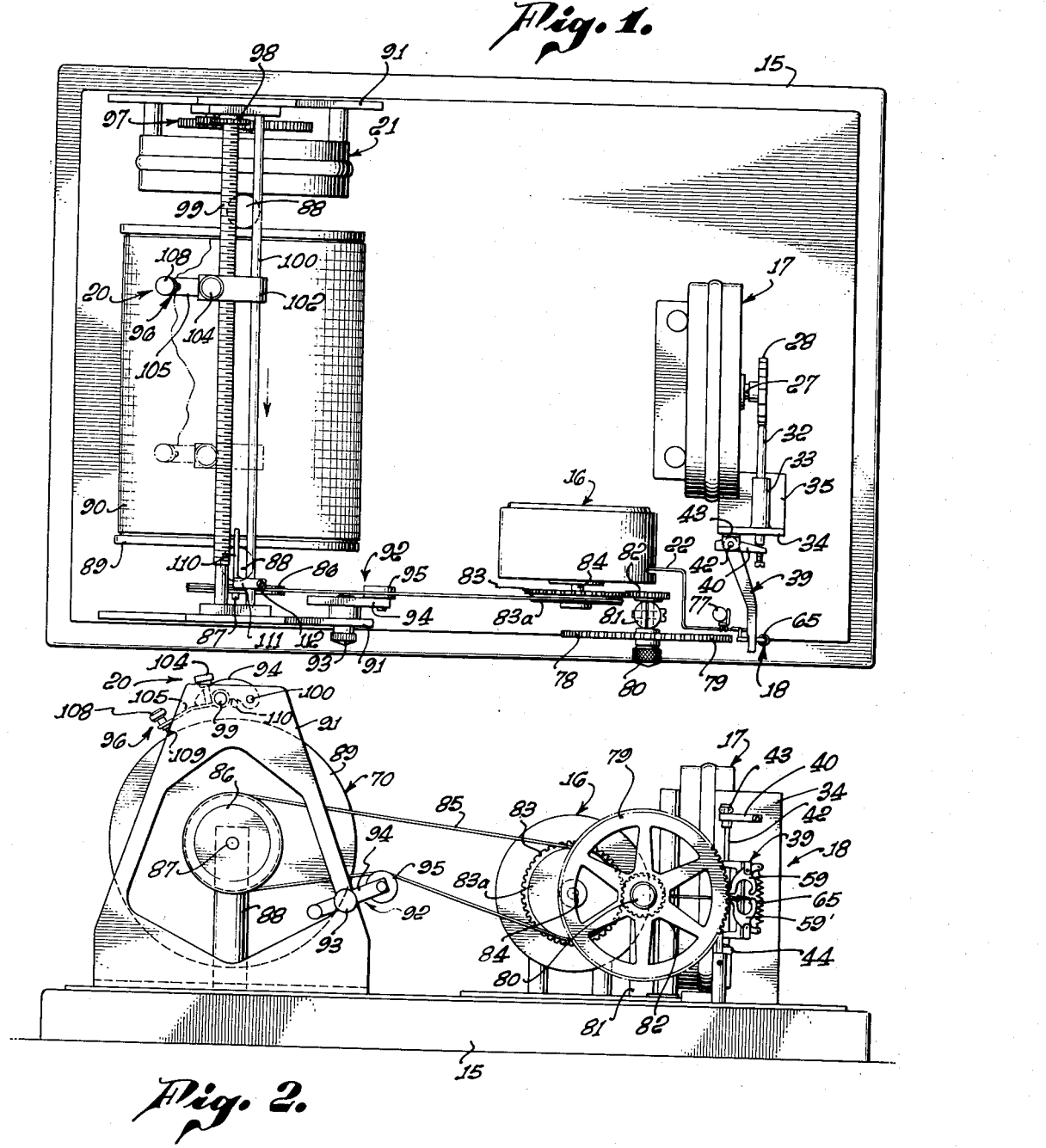
Fig. 1 is a top plan view of a precision recording barograph device embodying this invention.
Fig. 2 is a side view of the device shown in Fig. 1.

In Fig. 1, a precision field barograph instrument embodying this invention may comprise a flat rectangular base 15 adapted to carry a pressure responsive device 16, a drive means 17 for actuating at selected time intervals a means 18 for sensing and transferring a response of said pressure device to a recording means generally indicated at 20 and to device 16 for pressure balancing thereof. The recording means 20 may be driven by a second drive means 21.

The pressure responsive device 16 may comprise any suitable accurate precision barometric measuring device such as an aneroid or other pressure measuring instruments. Preferably, this barographic instrument includes a surveying altimeter employing the null or zero gauging method of measuring pressures. The pressure responsive device 16 illustrated is of this type and may be modified so as to provide an elongated laterally extending indicating pointer or arm 22. The pointer may be suitably bent, as shown in Fig. 1, to position its extremity in selected relationship with the transfer means 18. Device 16 responds to changes in pressure by vertical movement of the pointer 22 either upwardly or downwardly.

The free end of pointer 22 (Fig. 8) may be provided with a bent outwardly extending end portion 23 carrying a pair of horizontally spaced forwardly extending pins 24 and 25. Pin 24 is adapted to cooperate with a blade sensing means to detect position changes of pointer 22 and pin 25 is adapted to cooperate with a pawl means which is operably associated with the recording means and with the pressure device to balance the device and return the pointer to its null position.

The drive means 17 may comprise any suitable mechanical timing device capable of running for a selected period of time such as twenty-four hours. In Fig. 1, the drive means 17 is illustrated as a mechanically wound time clock having a horizontal shaft 27 extending outwardly therefrom for carrying a cam wheel 28. The cam wheel 28 may be provided with a plurality of circumferentially arranged teeth 29, each tooth having a relatively long gradually sloping face 30 and an abrupt relatively short steep face 31. The teeth may be of any selected number depending upon the time interval for which a record of pressure changes is desired.

A rod or push type follower 32 may be slidably carried by a sleeve 33 mounted opposite to the toothed edge of said wheel on an upstanding rectangular wall 34. An angle bracket 35 secured as by welding to the lower portion of wall 34 may be secured to base 15 by screws 36.

The follower 32 is afforded reciprocal movement in sleeve 33 by sliding contact of its free end with the faces on teeth 29 of the cam wheel 28. The follower 32 extends through wall 34 and terminates in an adjusting screw 37.

An oscillatable assembly 39 may be actuated by reciprocal movement of follower 32 by threaded connection of a crank arm 40 to adjusting screw 37 as at 41. The crank arm 40 may be carried by a vertical shaft 42 journaled at opposite ends in top and bottom brackets 43 and 44, respectively. Each bracket 43 and 44 may be suitably secured to wall 34 as by screws 45.

The oscillatable assembly 39 may include a pawl carrier means 47 having sidewardly extending horizontal top and bottom members 48 carried by shaft 42. The members 48 may be interconnected intermediate their ends by a web 49 merging with tapered vertical flanges 50 and 51 of top and bottom members 48, respectively. The carrier means 47 is provided with a slightly angularly offset end portion 52. In normal position, carrier means 47 is biased toward wall 34 by a tension spring 53 connected at one end to wall 34 as at 54 and to the bottom member 48 as at 55, said spring 53 normally positioning end portion 52 of the carrier means in virtually parallel relation to a vertical plane passing through follower rod 32.

The end portion 52 comprises in-turned end lugs 56 integrally formed with the top and bottom members 48 and inwardly spaced opposed ears 57 formed on said web 49, said lugs and ears 56 and 57 providing journals for carrying horizontal pivot pins 58 extending therebetween.

The top pivot pin 58 pivotally carries a depending bifurcated pawl member 59, said member 59 having a forwardly extending downwardly curved leg 60 provided with a pawl element 61 for engagement with a ratchet wheel 75. The member 59 also includes a rear downwardly curved leg 62 provided at its end with a forwardly facing wall 63 to contact opposed pin 25 of the pointer 22.

Similarly, the lower pin 58 carries an identically constructed bifurcated upstanding pawl member 59' having a forwardly extending upwardly curved leg 60' provided with a pawl element 61'. A rear upwardly curved leg 62' is also provided with forwardly facing wall 63' for contact with pin 25. The pawl members 59 and 59' are disposed in opposed relationship and each includes a rearwardly extending arm 64 and 64', respectively, which may be interconnected by a tension spring 65.

The pawl members 59 and 59' are held in normal opposed position by abutment of walls 63 and 63' with a laterally extending flat vertical stop 66 which lies in front of and partially overlies the forward faces of walls 63 and 63'. Stop 66 is formed as one leg of an integral angle clip 67, the other leg of said clip being centrally mounted on the outer end edge of a horizontal knife blade 68. The blade 68 is integrally formed at its inner end edge with a bracket 69 secured as by screws 70 adjacent to the apex of a V-shaped blade carrier 71. The carrier 71 may include diverging flanged legs 72 journaled on shaft 52 between members 48 of carrier means 47. The carrier 71 is spring-biased toward carrier 47 by springs (not shown) carried within hubs at shaft 42 and may be adjusted in its relationship therewith by an adjusting screw 73.

The blade 68 presents a knife edge 74 to pin 24 on the pointer 22, the knife edge being adapted to guide the pin 24 either above or below blade 66. The knife edge lies in a horizontal plane passing between opposed edges of walls 63 and 63'.

The pointer 22 may be limited in its vertical movement in response to atmospheric pressure changes. A pair of staggered eyelets 75 carried by a sleeve 76 on an upstanding post 77 and through which pointer 22 extends serves to limit the vertical movement of pointer 22 in its response to atmospheric pressure changes. Such movement is confined to a space which will permit pin 24 to pass either above or below blade 68.

In operation, the action of follower 32 on cam wheel 28 oscillates the assembly 39 including pawl carrier means 47 and blade carrier 71 about shaft 42 for limited reciprocal movement. Forward advancement of the blade 68 is relatively slow and uniform because the end of follower 32 is riding on the long sloping face 30 of a tooth 29 of the cam wheel. As the blade advances, the knife edge 74 guides pin 24 either above or below said blade, or pin 24 passes above or below blade 68, depending upon the position of pointer 22 as determined by atmospheric pressure. If, as illustrated, pin 24 rides below knife blade 68, the laterally spaced pin 25 will contact wall 63' of member 59' causing it to rotate clockwise about pin 58 and further tension spring 65. At the same time, the carriers 47 and 71 have advanced toward pointer 22 and pawl element 61 begins to engage teeth 78 of ratchet wheel 79 lying in the plane of the pawl members 59 and 59'. As advancement of the carriers continues, rotation of pawl member 59 transmits a lifting force to the ratchet wheel 79 through the engagement of the pawl element 61 therewith. Rotation of pawl member 59 is stopped when wall 63 contacts the stop 66. The adjusting screw 73 serves to selectively position the blade 68 and stop 66 with respect to the normal position of the pawl members and ends of pins 24 and 25 so that the amount of incremental rotation translated to the ratchet wheel may be accurately selected and controlled.

If pin 24 had been guided above blade 66, a similar sequence of movements would have followed so that pawl element 61' would have engaged the teeth of ratchet wheel 79 so as to transmit a downwardly acting force at the periphery of wheel 79.

The ratchet wheel 79 may be of relatively large diameter and have a preselected number of ratchet teeth 78 so as to transfer in desired increments of pressure changes the response of device 16 for recording. The wheel 79 is rotatable about a horizontal shaft 80 having an axis lying virtually in the plane of blade 68. The shaft 80 is journaled in a suitable post 81 and at one end carries a spur gear 82 of relatively small diameter. The gear 82 meshes with a toothed pulley wheel 83 suitably mounted on the centrally disposed shaft 84 of the modified pressure responsive device 16.

The pulley wheel 83 is provided with a pulley track 83a of slightly less diameter than the root diameter of the toothed pulley wheel 83. An endless belt 85 is carried at one end by the pulley track 83a and at the other end by a pulley 86, said belt being wrapped twice around each pulley to provide a positive non-slipping drive. The pulley 86 is carried adjacent to one end of a horizontal axle 87 journaled at opposite ends in upstanding spaced pedestals 88. Between the spaced pedestals 88 and on the axle 87 is carried a transversely arranged horizontal cylinder 89 of relatively large diameter and having a cylindrical wall for supporting a sheet of spatial surface paper 90 for dry pen recording.

Outwardly spaced from pedestals 88 are upstanding end frames 91, each suitably secured to base 15 adjacent the longitudinal edges thereof. One end frame 91 may carry a belt tensioning device 92 secured thereto by a bolt assembly 93. The tensioning device 92 may comprise an adjustable arm 94 and a roller 95 in contact with the lower lay of belt 85 for reducing slack in the belt.

Inwardly of the opposite end frame 91, a second drive means 21 is mounted on base 15 for moving a dry recording pen 96 longitudinally of the cylinder 89. The second drive means 21 may comprise a mechanically wound time clock substantially the same as drive means 17. The driven shaft of drive means 21 may be suitably connected through a gear train generally indicated at 97 to a gear 98 carried on an elongated threaded time screw 99. The time screw 99 may be journaled at opposite ends in upper portions of end frames 91 and extends parallel to the axle 87 of the cylinder 90 and in spaced relation above the cylinder surface.

Means for mounting the recording pen 96 for movement on the time screw 99 as the screw is rotated by the drive means 21 may comprise a rod 100 extending parallel to screw 99 and carried by the end frames 91. Pivotally and slidably mounted on rod 100 as at 101 is an arcuate arm 102 having a downwardly opened threaded recess 103 adapted to rest on the time screw in threaded engagement therewith. The free end of arm 102 is provided with a threaded bore through which extends a knurl-headed bolt 104 for connection to one end of a suitably sidewardly extending slightly downwardly bent resilient yieldable bar 105 held thereon by a nut 106. The opposite end of bar 105 carries a threaded hollow bushing 107 having threaded engagement with an adjustable nut 108 for properly positioning the pen 96 on the record paper 90. The pen 96 extends through said bushing and nut with its sharply pointed end 109 resting upon the sheet of recording paper 90.

Preferably, the pointed end 109 is made of soft metal, for example brass, adapted to cooperate with the surface of the record paper 90 to produce an extremely fine line or mark. The record paper is of well-known type having a surface treated for dry pen recording. A visible fine line is thus produced on the record paper under very light pressure of the pen 96 without the use of ink or printing fluid.

When the pen 96 and arm 102 reach the end of the time screw, means are provided for lifting the pen out of contact with the paper and the arm 102 out of threaded engagement with the time screw. Such lifting means may comprise an inwardly extending member 110 between rod 100 and the time screw and mounted on rod 100 as by a collar 111 and screw 112. The inwardly extending end 113 of member 110 may slope downwardly to present an upwardly inclined face 114 to a depending lug 115 formed on an aligned portion of arm 102. Thus, as the recording pen and arm 102 advance to the end of the record paper, the pen and arm will lift out of engagement with the paper and the time screw, respectively, and come to rest in an inoperable position.

The record paper 90 is preferably of a type having transverse lines or divisions equally spaced and suitable to indicate time. Longitudinally extending lines or divisions are relatively closely equally spaced and indicate pressure in .001 of an inch of mercury. It should be noted that the recording pen is driven according to time and the cylinder is incrementally rotated according to pressure changes to which the pressure responsive device 16 has responded.

In use and operation of the portable field barograph described above, the barograph may be placed at any selected base point in the area of the survey. The time clock driving means 17 and 21 are synchronized for operation together and the time at which the pen begins to mark the record paper is noted. Preferably, the time noted on paper 90 should be synchronized with a watch carried by the roving surveyor.

Response to pressure changes as indicated by movement of pointer 22 is intermittently sensed by the oscillatable assembly 39 through the blade 68. Each sensing operation results in actuation of a pawl member 59 or 59' to cause movement of ratchet wheel 79 and consequent incremental rotation of cylinder 89. Movement of wheel 79 also turns shaft 84 of the pressure device 16 for returning the pointer to zero or null position to bring the device 16 into balance. Oscillation of assembly 39 causes to be made an accurate substantially continuous record of pressure changes. Obviously, the number of oscillations is dependent upon the number of teeth in cam wheel 28.

The relationship of the movement of pointer 22 in response to pressure changes and the sensing and transferring of such movement through the ratchet wheel 79 and associated gear means is correlated with the record paper by suitable calibration so that each division on the record paper will represent the equivalent of .001 of an inch of mercury. The extremely fine line produced by the dry pen and record paper facilitates the maintenance of an accurate readable record.

The accurate virtually continuous record of pressure changes made by this recording field barograph enables the roving surveyor to readily and accurately correct pressure measurements taken by him at any selected time interval.

While the example of a field barograph device such as described above shows the utilization of a surveying altimeter of null or zero reading type, it is understood that other suitable pressure measuring devices may be modified so that they may be utilized in combination with the sensing and transferring means described above for the recordation of minute pressure changes. Obviously, the number of teeth in the cam wheel, ratchet wheel, and the gearing arrangement may be modified to provide a preselected unit of measure of pressure changes. Likewise, the belt and pulley means for rotating the drum may be modified by using a suitable gear train.

It is understood that numerous modifications and changes may be made in the barograph shown above, and all such modifications coming within the scope of the appended claims are embraced thereby.

I claim:

1. In a portable field barograph, the combination of: a pressure responsive means having a pressure indicating arm limitedly movable from null position in response to pressure changes; an oscillatable assembly intermittently movable into contact with said arm for sensing position changes of said arm; drive means for intermittently oscillating said assembly at predetermined time intervals, said pressure responsive means including a rotatable shaft extending therefrom and a gear carried on said shaft; a ratchet wheel shaft supported parallel to said rotatable shaft and carrying a gear meshed with said gear on said rotatable shaft; a ratchet wheel carried by said ratchet wheel shaft and intermittently actuated by responsive contact of said oscillatable assembly with said pressure indicating arm, said rotatable shaft for said pressure responsive means being provided with means for connecting and transmitting rotation of said rotatable shaft to an associated recording means.

2. In a portable field barograph, the combination of: a null type pressure responsive means having a pressure indicating arm movable from null position in response to pressure changes, said pressure responsive means including a rotatable shaft; means for limiting movement of said pressure indicating arm in response to pressure changes; a ratchet wheel and a shaft therefor; gear means interconnecting said ratchet wheel shaft and said gear on said rotatable shaft; said ratchet wheel and said pressure indicating arm having portions in close proximity; an oscillatable assembly adjacent said ratchet wheel and said pointer and intermittently movable into contact with said arm for sensing position changes of said arm and for engagement with said ratchet wheel upon pressure change indicated by said arm for turning said ratchet wheel and for turning said rotatable shaft through said gear means for returning the pressure responsive means into null position; and means for driving said oscillatable assembly, said rotatable shaft having means adapted to be connected to a recording means.

References Cited in the file of this patent

UNITED STATES PATENTS

| | | |
|---|---|---|
| 681,536 | Friez | Aug. 27, 1901 |
| 1,964,632 | Hays | June 26, 1934 |
| 2,011,774 | Paulin | Aug. 20, 1935 |
| 2,265,045 | Pfeiffer | Dec. 2, 1941 |